(12) United States Patent
Bell et al.

(10) Patent No.: US 9,355,542 B2
(45) Date of Patent: May 31, 2016

(54) APPARATUSES, SYSTEMS AND METHODS FOR SELF-TESTING OPTICAL FIRE DETECTORS

(71) Applicant: KIDDE TECHNOLOGIES, INC., Wilson, NC (US)

(72) Inventors: Ken Bell, Raleigh, NC (US); Robert Thebert, Raleigh, NC (US)

(73) Assignee: Kidde Technologies, Inc., Wilson, NC (US)

(*) Notice: Subject to any disclaimer, the term of this patent is extended or adjusted under 35 U.S.C. 154(b) by 0 days.

(21) Appl. No.: 14/164,409

(22) Filed: Jan. 27, 2014

(65) Prior Publication Data

US 2015/0213699 A1    Jul. 30, 2015

(51) Int. Cl.
| | | |
|---|---|---|
| G01J 5/08 | (2006.01) | |
| G08B 17/12 | (2006.01) | |
| G01J 5/00 | (2006.01) | |
| G01J 5/04 | (2006.01) | |
| G01J 5/52 | (2006.01) | |
| G01J 5/54 | (2006.01) | |
| G08B 29/14 | (2006.01) | |
| G01J 5/10 | (2006.01) | |

(52) U.S. Cl.
CPC ............... *G08B 17/12* (2013.01); *G01J 5/0014* (2013.01); *G01J 5/04* (2013.01); *G01J 5/0803* (2013.01); *G01J 5/0896* (2013.01); *G01J 5/10* (2013.01); *G01J 5/522* (2013.01); *G01J 5/54* (2013.01); *G08B 29/145* (2013.01)

(58) Field of Classification Search
CPC ........ G08B 17/10; G08B 17/12; G08B 17/00; G08B 17/103; G08B 29/145
USPC ........................................................ 250/338.1
See application file for complete search history.

(56) References Cited

U.S. PATENT DOCUMENTS

| | | | | |
|---|---|---|---|---|
| 5,451,931 | A | * | 9/1995 | Muller et al. ................... 340/630 |
| 5,812,270 | A | * | 9/1998 | Hampton et al. .............. 356/394 |
| 5,914,489 | A | * | 6/1999 | Baliga et al. .............. 250/339.05 |
| 7,132,645 | B2 | * | 11/2006 | Korn .......................... 250/227.11 |
| 7,564,365 | B2 | * | 7/2009 | Marman et al. ................ 340/628 |
| 8,201,973 | B2 | * | 6/2012 | Kudoh et al. .................. 362/253 |
| 8,346,500 | B2 | * | 1/2013 | Lee et al. ....................... 702/134 |
| 8,400,314 | B2 | * | 3/2013 | Dittmer et al. ................ 340/578 |
| 8,564,879 | B1 | | 10/2013 | Eaton et al. |
| 2003/0058114 | A1 | | 3/2003 | Miller et al. |
| 2003/0164461 | A1 | * | 9/2003 | Kelly et al. ............... 250/504 R |
| 2004/0066512 | A1 | * | 4/2004 | Politze et al. .................. 356/338 |
| 2010/0260229 | A1 | * | 10/2010 | Grubb et al. ...................... 374/2 |
| 2013/0086977 | A1 | * | 4/2013 | Wong ............................ 73/31.05 |
| 2013/0228692 | A1 | | 9/2013 | Larsen |
| 2013/0286391 | A1 | | 10/2013 | Erdtmann |
| 2014/0197317 | A1 | * | 7/2014 | Yang et al. .................. 250/341.8 |

* cited by examiner

*Primary Examiner* — Marcus Taningco

(57) ABSTRACT

An integral testing system for testing OFDs is provided. The OFD may comprise a body, a detector, and an infrared source. The detector and the infrared source may be housed with the body. The infrared source may be configured to generate emissions having one or more infrared wavelengths that are detectable by the detector. The infrared source may be configured to produce infrared emissions to simulate flaming fire.

16 Claims, 1 Drawing Sheet

APPARATUSES, SYSTEMS AND METHODS FOR SELF-TESTING OPTICAL FIRE DETECTORS

FIELD

The present disclosure generally relates to apparatuses, systems, and methods for testing optical flame detectors ("OFDs") and, more specifically, to OFDs comprising self-test systems.

BACKGROUND

Testing and calibration of infrared OFDs in the mid-infrared wavelengths relies on heat sources (e.g., heater elements, black bodies or flaming fires). For various reasons (e.g., speed, convenience, accuracy, precision, and expense), none of these solutions are particularly commercially satisfactory. In addition, none of the solutions are particularly suitable for field testing of an infrared flame detection system.

SUMMARY

An optical flame detector may comprise a body, an infrared source, and a detector. The infrared source may be housed with the body. The detector may be housed within the body. The detector may be configured to receive a first emission from the infrared source.

A self-testing fire suppression system may comprise an optical flame detector. The optical flame detector may comprise a first detector, a second detector, and a first infrared source. The first infrared source may be configured to produce an emission that is detectable by at least one of the first detector and the second detector.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
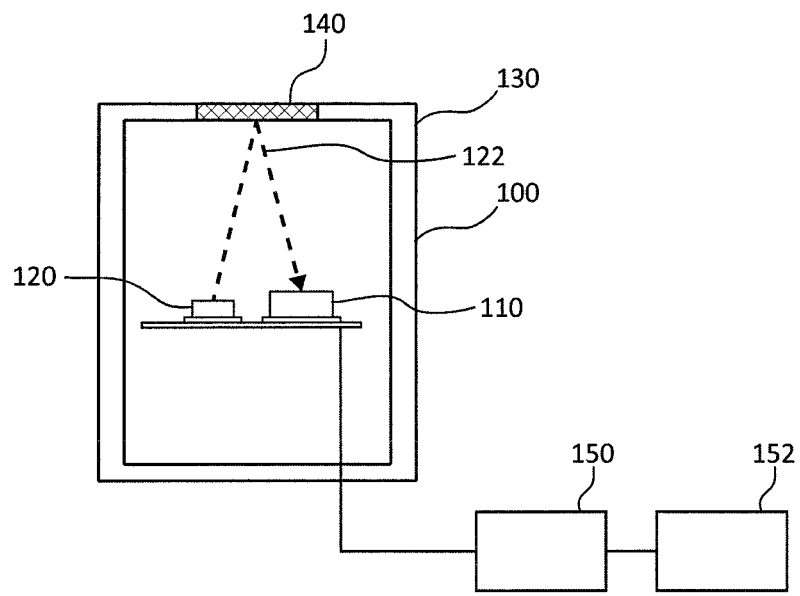
FIG. 1 illustrates a cross-sectional view of a first self-testing OFD, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Microelectromechanical systems ("MEMS") based infrared sources may enable construction of more accurate and precise test equipment to test and/or verify operation of flame detection sensors and/or systems. Moreover, this test equipment may reduce and/or eliminate the need for other types of heat sources (e.g., heater elements, black bodies, flaming fires, and/or the like). In various embodiments, MEMS systems may be micromachines, micro systems technology and/or the like that have a typical size from approximately 20 micrometers to approximately 1 millimeter.

In various embodiments, a testing system comprising one or more MEMS infrared emitters may be integrally installed in and used to test infrared OFDs. In this regard, the OFD may comprise multiple MEMS infrared emitters with each MEMS infrared emitter emitting a particular wavelength of infrared. For example, the OFD may comprise a first MEMS infrared emitter emitting mid infrared and a second MEMS infrared emitter emitting near infrared. Accordingly, the OFD may be capable of testing multi-channel infrared detectors. In this regard, the OFDs may detect infrared at one wavelength and/or various wavelengths. The infrared spectrum is typically regarded as electromagnetic radiation of wavelengths 700 nm to 1 mm. Mid infrared may be regarded as between 3 μm to 8 μm. Near infrared may be regarded as between 0.75 μm to 1.4 μm. Short wavelength infrared may be regarded as between 1.4 μm to 3 μm. Wavelengths typically emitted by a MEMS infrared emitters may include, for example, approximately 0.9 μm, approximately 2.8 μm and/or approximately 4.3 μm.

In various embodiments, a MEMS infrared emitter may be a film-like device (e.g., a film resistor). In this regard, the MEMS infrared emitter may have characteristics similar to a resistor in a circuit. The MEMS infrared emitter may have nearly zero mass. Nearly zero mass may allow for rapid heating and cooling of the MEMS infrared emitter (e.g., heating in milliseconds). In various embodiments, the MEMS infrared source may behave like a heater. In this regard, the MEMS infrared source may sweep through a plurality of infrared wavelengths (e.g., wavelengths from approximately 0.75 μm to 8 μm). In various embodiments, a MEMS infrared emitter may have a longer life than typical heating sources used for sensor testing.

In various embodiments and with reference to FIG. 1, an OFD 100 may comprise a detector 110 (e.g., a sensor) and an infrared source 120. Detector 110 and infrared source 120 may be housed within body 130. Body 130 may include an opening including a window 140. Window 140 may optically and/or operatively couple detector 110 and the environment surrounding OFD 100. OFD 100 may also be operatively and/or electrical coupled to a fire suppression system 150. Fire suppression system 150 may include a fire suppression system (e.g., a sprinkler system), a controller, a power source, a data collection system, a notification system and/or the like. Moreover, fire suppression system 150 may comprise any suitable microprocessor, circuitry, a hardware-software system, and/or the like configured to control self-testing operations and/or emissions from infrared source 120.

In various embodiments, infrared source 120 may comprise a single MEMS infrared emitter or an array of multiple MEMS infrared emitters and/or light emitting diodes ("LED") emitters that are capable of emitting visible light and/or IR. In this regard, the array may comprise a plurality of MEMS infrared emitters. The array may also comprise one or more infrared emitters and/or one or more LED emitters. The LED emitters may be configured to produce a first set of wavelengths (e.g., shorter wavelengths such as, for example, 0.9 μm). The one or more infrared emitters may be configured to produce a second set of wavelengths (e.g., longer wavelengths, such as, for example, 2.8 μm and 4.3 μm). Moreover, the LED emitters and infrared emitters may be configured to operate at the same time or at different times, depending upon which particular test is being conducted.

In various embodiments, infrared source 120 may be installed at a specified distance and orientation relative to detector 110. In this regard, infrared source 120 may be an appropriate distance from detector 110 to insure proper self-testing and/or infrared emission detection. Moreover, infrared source 120 may be configured to directly illuminate detector 110.

In various embodiments, OFD 100 and/or fire suppression system 150 may comprise a user input 152. User input 152 may be operatively coupled to and/or in electronic communication with infrared source 120 and/or fire suppression system 150. In this regard, the user input may be capable of communicating an input to perform and/or initiate a self-test to at least one of infrared source 120 and/or fire suppression system 150. In various embodiments, user input 152 may comprise a switch. In various embodiments, user input 152 may comprise an electronic interface configured to receive input from another electronic device. For example, user input 152 may comprise a Universal Serial Bus ("USB") interface. In such embodiments, the USB interface of user input 152 may receive logical commands from another electronic device such as a cell phone, smart phone, tablet, personal digital assistant, laptop computer, desktop computer, and combinations of the same.

In various embodiments, window 140 may be operatively coupled and/or formed in body 130 of OFD 100. Window 140 may allow detector 110 to monitor and/or evaluate and environment within which OFD 100 is installed. Window 140 may comprise one or more coatings, screens, lenses and/or the like. In this regard, window 140 may be capable of reflecting emission 122 from infrared source 120 to detector 110. In this regard, infrared source 120 may be positioned so as not to obstruct the field of monitoring of detector 110, but may still be capable of creating emission 122 to conduct a self-test of detector 110.

In various embodiments, window 140 may be glass, sapphire, a crystal structure and/or the like. Window 140 may comprise a transparent structure and/or film configured to modify and/or conditions emissions that interact with window 140. Window 140 may be configured to filter emissions from infrared source 120. In this regard, detector 110 may be exposed to and/or detect particular wavelengths based on and/or in response to the filtering.

Figure 2:
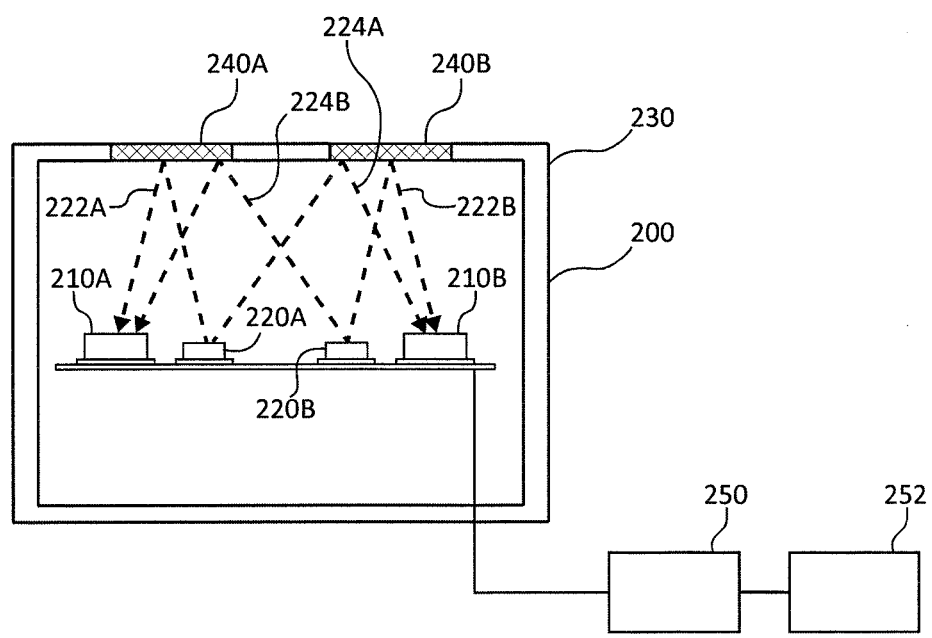
FIG. 2 illustrates a cross-sectional view of a second self-testing OFD, in accordance with various embodiments.

In various embodiments and with reference to FIG. 2, OFD 200 may comprise a plurality of detectors 210 (shown as 210 and 210B in FIG. 2). The plurality of detectors 210 may be housed in body 230. OFD may also comprise a plurality of infrared sources 220 (shown as 220A and 220B in FIG. 2).

In various embodiments, OFD 200 may comprise a first infrared source 220A and a second infrared source 220B. In this regard, OFD 200 may be capable of testing for multiple wavelengths. For example, first infrared source 220A may be capable of create a first emission 222A having a first wavelength. First emission 222A may be directed to first detector 210A and may be reflected from first window 240A. First infrared source may also be capable of creating a second emission 224A having the first wavelength. Second emission 224A may be directed to second detector 210B. First emission 222A and second emission 224A may be substantially similar.

In various embodiments, second infrared source 220B may be capable of creating a third emission 222B and a fourth emission 224B. Third emission 222B and fourth emission 224B may have a second wavelength. Third emission 222B may be reflected from second window 240B and directed to second detector 210B. Fourth emission 224B may be directed to first detector 210A. Third emission 222B and fourth emission 224B may be substantially similar.

In various embodiments, user input 252 may be in electronic communication with fire suppression system 250 and/or first infrared source 220A and second infrared source 220B. In this regard, an input at user input 252 may cause first emission 222A, second emission 224A, third emission 222B, and/or fourth emission 224B.

In various embodiments, the plurality of infrared sources 220 may be selectable. For example and in response to an input at user input 252, at least one of first infrared source 220A and second infrared source 220B may be activated and may produce infrared emissions having wavelengths of for example, approximately 0.9 μm, approximately 2.8 μm and/or approximately 4.3 μm. The plurality of infrared sources 220 may be caused to emit infrared simultaneously, individually, and/or in a preselected pattern.

In various embodiments, infrared sources 220 may be, for example, MEMS-based high output infrared sources and/or LED based near infrared sources 220. Infrared sources 220 may be configured in an array. In this regard, infrared sources 220 may be arranged to produce emissions that simulate a fire. Infrared sources 220 may have rapid response rates.

In various embodiments, OFD 200 may comprise a single infrared source 220. In this regard, infrared source 220 may be capable a creating a plurality of emissions having various wavelengths including, for example, first emission 222A, second emission 224A, third emission 222B, and/or fourth emission 224B.

In various embodiments, field testing of OFD 200 in operating environment may be challenging to conventional systems. If OFD 200 should be tested using a flicker effect for activation and space around installed OFD 200 is limited, testing may be challenging and/or impossible with conventional testing systems and procedures. Conventional testing systems and procedures that are bright enough to activate OFD 200 may be of significant size. Moreover, the flicker function may require a mechanical chopper to introduce the time varying output. In this regard, the constraints created by limited space in environment where OFD 200 is installed to make integral testing capabilities more efficient and desirable.

In various embodiments, infrared source 220 may be a MEMS-based high output infrared source that has reproducible output in the infrared spectrum of emissions having wavelengths of approximately 1 μm to approximately 20 μm. In OFD 200, infrared source 220 may be capable of producing full output infrared emissions in tens of milliseconds.

In various embodiments, OFD 200 may comprise infrared source 220 mounted within the casing of OFD 200 such that, if activated by a self-test command, detector 210 of OFD 200 may detect the emission. In response to, successful detection of infrared source 220, electrical amplification circuitry and alarm logic of OFD 200 may generate a signal and/or indicate to flame suppression system 250 to indicate that the self-test was successful. A successful self-test of OFD 200 may indicate that detector 210 is capable of detecting emissions and that the controller unit and/or alarm output circuitry of OFD 200 is operational.

In various embodiments, one or more infrared sources and detectors may be mounted on separate boards and/or in separate locations. Moreover, these separate infrared sources and/or detectors may be optically coupled. In this regard, the infrared source (e.g., infrared source 120 as shown in FIG. 1) may be in a "direct line of sight" with a detector (e.g., detector 110 as shown in FIG. 1).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An optical flame detector comprising:
    a body;
    a first infrared source housed within the body and configured to generate a first emission having a first wavelength;
    a second infrared source housed within the body and configured to generate a second emission having a second wavelength that is different than the first wavelength, the first emission and the second emission being generated in less than one hundred milliseconds and in response to receiving a request to perform a self-test;
    a first window coupled to the body and configured to filter and reflect the first emission from the first infrared source and the second emission from the second infrared source;
    a second window coupled to the body and configured to filter and reflect the first emission from the first infrared source and the second emission from the second infrared source;
    a first detector housed within the body and configured to monitor an environment through the first window and to receive the first emission from the first infrared source reflected by the first window and to receive the second emission from the second infrared source reflected by the first window; and
    a second detector housed within the body and configured to monitor the environment through the window and to receive the first emission from the first infrared source reflected by the second window and to receive the second emission from the second infrared source reflected by the second window.

2. The optical flame detector of claim 1, wherein the first infrared source is capable of producing a plurality of emissions having wavelengths of approximately 1 μm to approximately 20 μm.

3. The optical flame detector of claim 1, wherein the first infrared source is collocated on the same surface as the first detector.

4. The optical flame detector of claim 1, wherein the first infrared source is a MEMS device.

5. The optical flame detector of claim 1, further comprising a LED emitter.

6. The optical flame detector of claim 5, wherein the LED emitter is configured to generate a third emission having a third wavelength that is different than the first wavelength and the second wavelength.

7. The optical flame detector of claim 1, wherein the first infrared source is configured to produce full output infrared emissions in tens of milliseconds.

8. The optical flame detector of claim 1, wherein the first infrared source is a film-like device.

9. The optical flame detector of claim 8, wherein the first infrared source is a film resistor.

10. The optical flame detector of claim 1, wherein the first window is at least one of operatively coupled to or formed in the body and wherein the first infrared source is positioned within the body such that the first infrared source does not obstruct a field of monitoring of the detector.

11. A self-testing fire suppression system comprising:
    an optical flame detector comprising,
        a first detector,
        a second detector,
        a first infrared source configured to produce a first emission having a first wavelength and a second emission having a second wavelength in less than one hundred milliseconds and that is different than the first wavelength, a first window configured to filter and reflect the first emission and the second emission from the first infrared source to the first detector, and a second window configured to filter and reflect the first emission and the second emission from the first infrared source to the second detector.

12. The self-testing fire suppression system of claim 11, wherein the first infrared source is a MEMS based infrared source.

13. The self-testing fire suppression system of claim 11, wherein the optical flame detector further comprises an LED emitter.

14. The self-testing fire suppression system of claim 11, wherein the optical flame detector further comprises a second infrared source.

15. The self-testing fire suppression system of claim 14, wherein the second infrared source is configured to produce a third emission having a third wavelength that is different than the first wavelength and the second wavelength.

16. The self-testing fire suppression system of claim 11, wherein the first infrared source is configured to produce emissions having wavelengths of approximately 1 µm to approximately 20 µm.

* * * * *